United States Patent
Park et al.

(10) Patent No.: US 8,730,331 B2
(45) Date of Patent: May 20, 2014

(54) DISPLAY APPARATUS AND CALIBRATION METHOD THEREFOR

(75) Inventors: Ji-yong Park, Yongin-si (KR); Sang-kyun Im, Seoul (KR); Nam-kyun Beon, Seoul (KR); Young-hoon Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 174 days.

(21) Appl. No.: 13/314,920

(22) Filed: Dec. 8, 2011

(65) Prior Publication Data

US 2012/0320221 A1 Dec. 20, 2012

(30) Foreign Application Priority Data

Jun. 16, 2011 (KR) .......................... 10-2011-0058652

(51) Int. Cl.
*H04N 17/00* (2006.01)
*G06F 15/00* (2006.01)

(52) U.S. Cl.
USPC ............. 348/189; 348/190; 345/207; 358/1.9

(58) Field of Classification Search
USPC ........................................ 345/207; 463/25, 31
See application file for complete search history.

(56) References Cited

U.S. PATENT DOCUMENTS

| | | | |
|---|---|---|---|
| 2009/0141295 A1* | 6/2009 | Hayashi | 358/1.9 |
| 2010/0013812 A1* | 1/2010 | Gu et al. | 345/207 |
| 2013/0095913 A1* | 4/2013 | Dabrowski | 463/25 |
| 2013/0095919 A1* | 4/2013 | Saito et al. | 463/31 |

\* cited by examiner

*Primary Examiner* — Jefferey Harold
*Assistant Examiner* — Sihar Karwan
(74) *Attorney, Agent, or Firm* — Sughrue Mion, PLLC

(57) ABSTRACT

A display apparatus is disclosed. The display apparatus includes a display unit which displays a calibration screen divided into a plurality of areas when a calibration mode is initiated, an image generating unit which generates a guide image for displaying an arrangement position of a calibrator, and a controlling unit which controls the display unit to display a guide image on areas where calibration is to be performed of the plurality of areas. Accordingly, it becomes possible to improve user convenience and exactness of calibration.

21 Claims, 12 Drawing Sheets

DISPLAY APPARATUS AND CALIBRATION METHOD THEREFOR

CROSS-REFERENCE TO RELATED APPLICATIONS

This application claims priority from Korean Patent Application No. 2011-00058652, filed in the Korean Intellectual Property Office on Jun. 16, 2011, the disclosure of which is incorporated herein by reference in its entirety.

BACKGROUND OF THE INVENTION

1. Field of the Invention

Methods and apparatuses consistent with the exemplary embodiments relate to a display apparatus and calibration method therefor, and more particularly, to a display apparatus for performing calibration using a calibrator, and a calibration method therefor.

2. Description of the Related Art

There is a phenomenon where color information moves or brightness changes due to the color characteristics, electrical characteristics, or optical characteristics of a display apparatus even when the same color needs to be expressed. Such a phenomenon is called spatial non-uniformity. In general, brightness may change up to 40% in a display apparatus.

Meanwhile, in a professional monitor or a broadcasting reference television, the uniformity characteristics of a display apparatus are extremely important elements. In the case of a broadcasting reference television, the required uniformity is 95% or more. Due to the optical, electrical, and physical characteristics of the current display apparatuses (liquid crystal display (LCD), plasma display panel (PDP), organic light emitting diode (OLED), etc.), there is a significant cost associated with satisfying the required specifications, and thus a method to solve this problem through signal processing is needed.

Signal processing can be used to measure the brightness through an external calibrator, and to perform non-uniformity correction using the measured information.

In such a case, the entire display size of the pertinent local area is displayed in order to measure relevant data, such as the color coordinates and brightness of the pertinent local area, for non-uniformity correction. A user places the calibrator in the center of the pertinent local area by eye measurement and measures the data.

Herein, if a sensor of the calibrator is not placed where the user intends to measure, the sensor is rendered unable to perform an exact non-uniformity correction. In particular, there is at least one specific case where it is impossible to measure the edges due to apparatus characteristics of the calibrator.

FIGS. 1A to 1D are views which illustrate several problems of the conventional art.

FIG. 1A is a view illustrating the nonconformity relationship of a calibrator and a measuring position when performing a non-uniformity correction on a local area of 5×5.

According to FIG. 1A, a situation may occur where the calibrator is caught on a bezel of a display screen, making it impossible to measure the data.

In this case, as illustrated in FIG. 1B, the user must rotate the calibrator 180° for an exact measurement.

In addition, as illustrated in FIG. 1C, another situation may occur which presents a problem that the greater the number of the local areas, as, for example, in a local area of 7×7, the greater the number of various angles to which the user must rotate the calibrator to perform an exact measurement.

Further, if a general user is required to figure out the position of the calibrator, as illustrated, for example, in FIG. 1D, and rotate the calibrator every time to perform a measurement in the center of the pertinent local area, additional problems of increased inconvenience for the user and reduced exactness of the measurement tend to arise.

SUMMARY OF THE INVENTION

An aspect of the exemplary embodiments relates to a display apparatus for displaying a guide image which guides an arrangement position of a calibrator, and a calibration method therefor.

A display apparatus, according to an exemplary embodiment, includes a display unit which displays a calibration screen which is divided into a plurality of areas when a calibration mode is initiated, an image generating unit which generates a guide image for displaying an arrangement position of a calibrator, and a controlling unit which controls the display unit to display the guide image on an area of the plurality of areas where a calibration is to be performed.

The controlling unit may control the display unit to display the guide image on one of the areas where calibration is to be performed, delete the guide image which was displayed when the calibration is performed in the respective area, and display the guide image on a next area.

The controlling unit may control the display unit to display a plurality of guide images on all areas where the calibration is to be performed.

The controlling unit may control the display unit to delete guide images from the plurality of guide images on areas where calibration has been performed.

In some exemplary embodiments, the guide image is of a same shape and size as the calibrator, and a guide image displayed on an edge area or a corner area of the plurality of areas may be rotated so that the calibration can be performed in the center of the respective area.

The guide image may be a guide image which displays directivity so as to induce rotation of the calibrator in edge areas or corner areas of the plurality of areas.

In another aspect, a calibration method according to an exemplary embodiment of the present inventive concept includes displaying a calibration screen which is divided into a plurality of areas when a calibration mode is initiated, and displaying guide images on areas from the plurality of areas where calibration is to be performed.

In some embodiments, the displaying may include displaying a guide image on one of the areas where the calibration is to be performed, deleting the guide image which was displayed when the calibration is completed in the area where the guide image is displayed, and displaying a guide image on a next area from the plurality of areas where the calibration is to be performed.

The displaying may include displaying a plurality of guide images on all areas where the calibration is to be performed.

The displaying may further include deleting guide images on areas from the plurality of areas where the calibration has been completed.

In some exemplary embodiments, the guide image may be of a same shape and size as the calibrator, and a guide image displayed on an edge area or a corner area of the plurality of areas may be rotated so that the calibration is performed in the center of the respective area.

The guide image may be a guide image which displays directivity so as to induce rotation of the calibration on the edge areas or the corner areas of the plurality of areas.

In yet another aspect, a record medium for storing a program for performing a calibration method of a display apparatus according to an exemplary embodiment of the present inventive concept is provided. The method includes displaying a calibration screen which is divided into a plurality of areas when a calibration mode is initiated, and displaying a guide image for displaying an arrangement position of a calibrator on an area from the plurality of areas where a calibration is to be performed.

In some exemplary embodiments, the displaying may include displaying the guide image on one of the areas where the calibration is to be performed, and deleting the guide image which was displayed when the calibration is completed on the area where the guide image is displayed, and displaying the guide image on a next area from the plurality of areas where the calibration is to be performed.

In some exemplary embodiments, the displaying may include displaying a plurality of guide images on all the areas where the calibration is to be performed.

The displaying may further include deleting the guide images on the areas from the plurality of areas where the calibration has been completed.

In some exemplary embodiments, the guide image may be of the same shape and size as the calibrator, and a guide image which is displayed on an edge area or a corner area of the plurality of areas may be rotated so that calibration is performed in the center of the respective area.

The guide image may be a guide image which displays directivity so as to induce rotation of the calibrator in the edge area or the corner area of the plurality of areas.

In still another aspect, a recording medium for storing a program performing a calibration method of a display apparatus according to an exemplary embodiment of the present inventive concept is provided. The calibration method may include displaying a calibration screen which is divided into a plurality of areas, and displaying guide images for displaying an arrangement position of a calibrator on areas from the plurality of areas where the calibration is to be performed.

In some exemplary embodiments, the guide image is of a same shape and size as the calibrator, and a guide image displayed on an edge area or a corner area of the plurality of areas may be rotated so that the calibration is performed in the center of the respective area.

The guide image may also be a guide image which displays directivity so as to induce rotation of the calibrator in the edge areas or the corner areas of the plurality of areas.

Accordingly, it becomes possible to improve both user convenience and exactness of the calibration when performing non-uniformity correction.

BRIEF DESCRIPTION OF THE DRAWINGS

The above and/or other aspects of the present inventive concept will be more apparent by describing in detail exemplary embodiments thereof with reference to the accompanying drawings, in which.

DETAILED DESCRIPTION

Figure 1A:
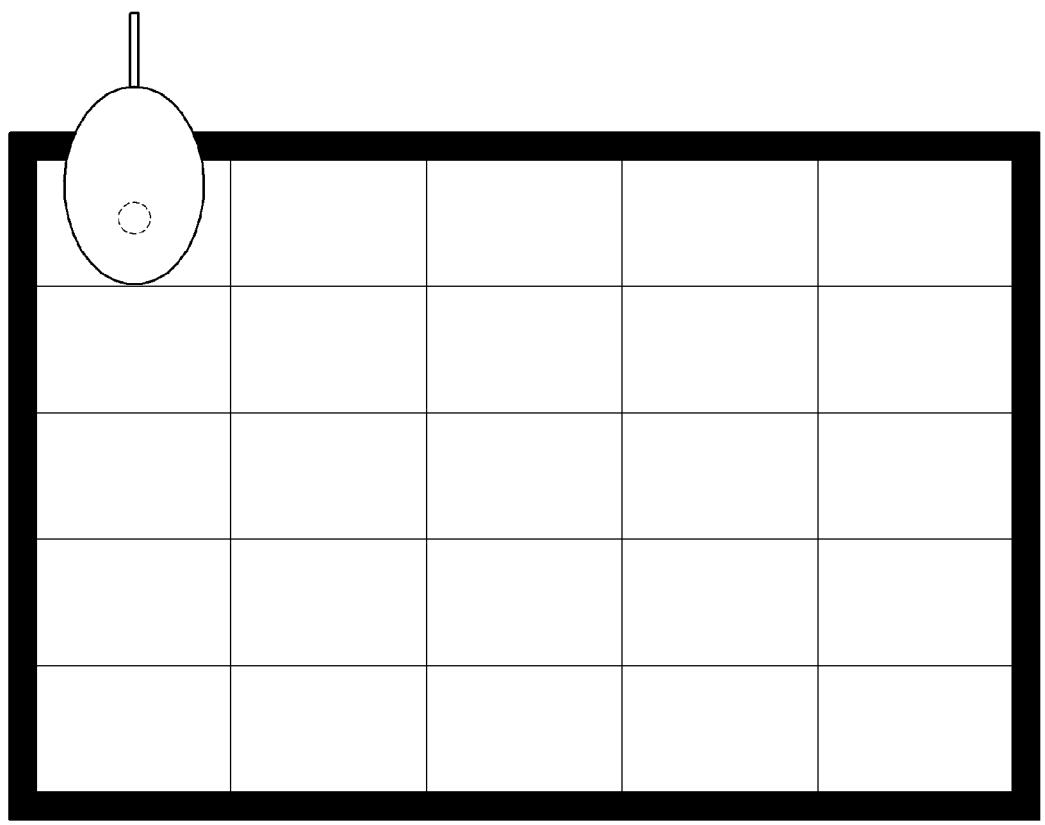
FIGS. 1A, 1B, 1C, and 1D are views which illustrate several problems of the conventional art.
Figure 1B:
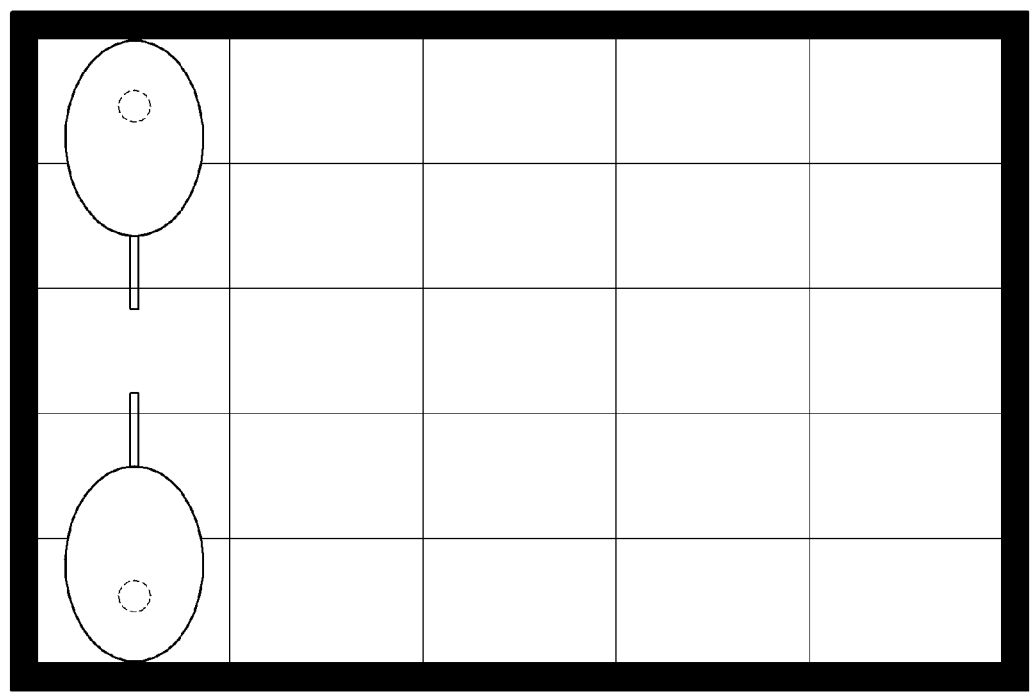
Figure 1C:
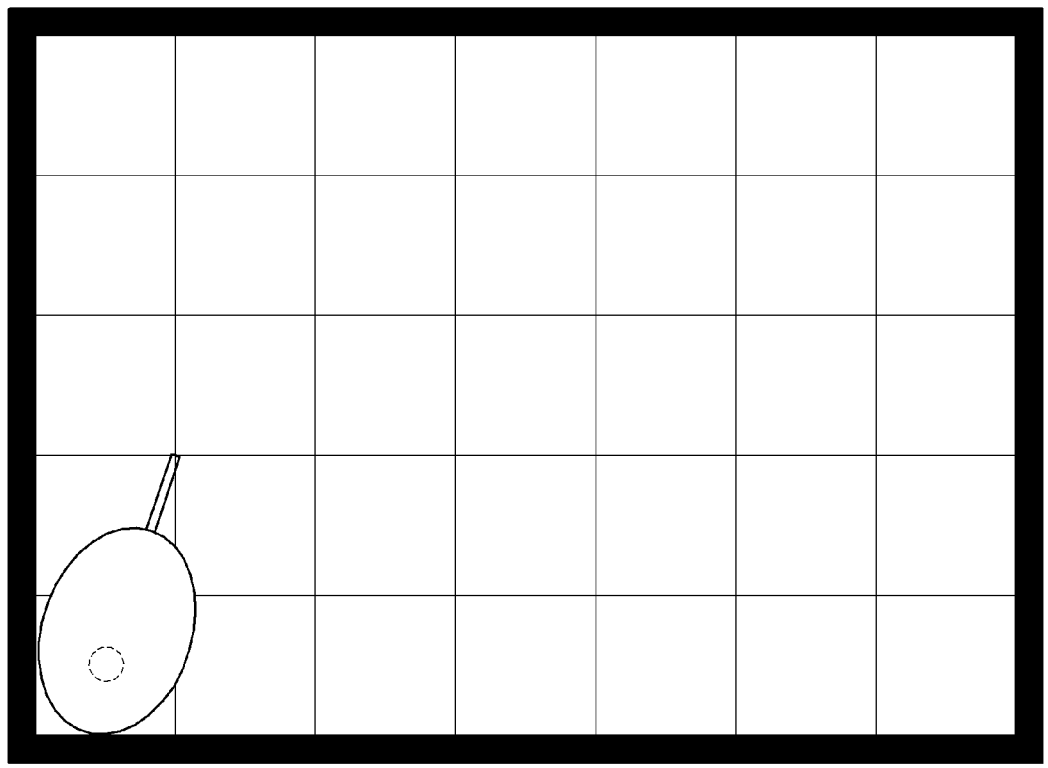
Figure 1D:
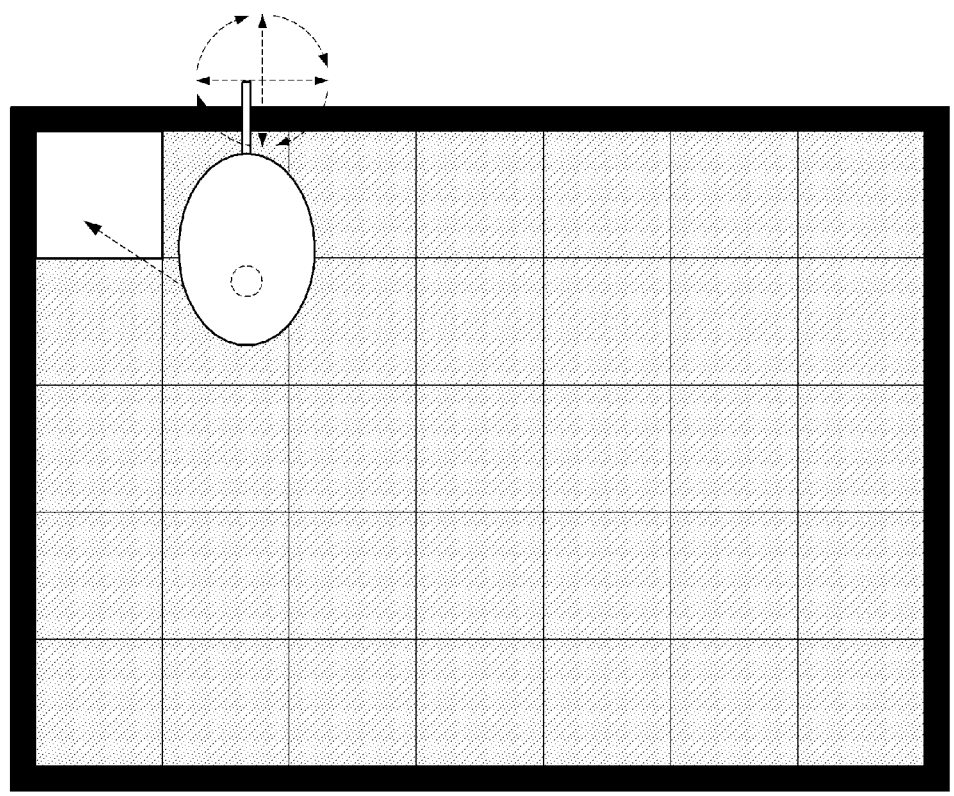

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Figure 2:
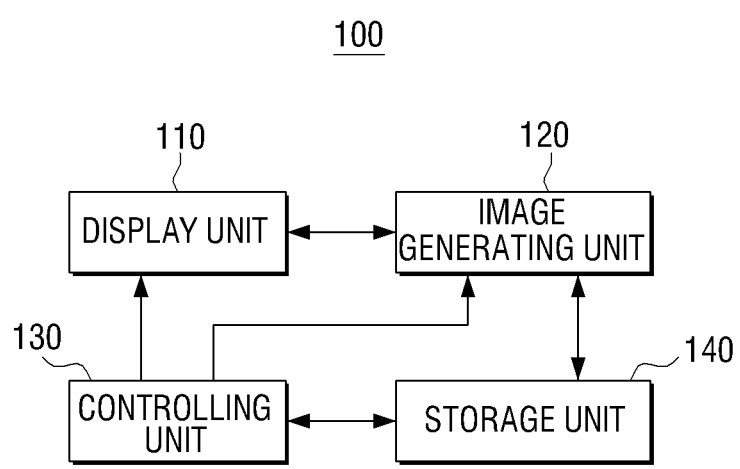
FIG. 2 is a block diagram which illustrates a configuration of a display apparatus according to an exemplary embodiment of the present inventive concept.

FIG. 2 is a block diagram which illustrates a configuration of a display apparatus according to an exemplary embodiment of the present inventive concept.

The display apparatus 100 may be configured to perform a non-uniformity correction operation using a calibrator. In particular, the display apparatus 100 may display a guide image of an arrangement position of the calibrator so that an exact calibration can be performed in consideration of the apparatus characteristics and the size of the calibrator and the display apparatus during a non-uniformity correction operation.

Herein, the display apparatus 100 may be embodied in various shapes. For example, the display apparatus 100 may be embodied as a professional monitor or a broadcasting reference television where display uniformity functions as a major element. In addition, in some cases, the display apparatus 100 may be embodied as one of various display apparatuses which display image signals such as, for example, a digital television, a desktop computer, a notebook computer, a mobile telephone, a digital broadcasting terminal, or a navigation terminal.

Hereinafter, each configurative element of the display apparatus 100 will be described.

A display unit 110 may be embodied as at least one of a liquid crystal display, a thin film transistor-liquid crystal display, a plasma display panel, an organic light-emitting diode, a flexible display, and a three-dimensional display.

The display unit 110 may display a calibration screen which is divided into a plurality of areas when a calibration mode for performing a non-uniformity correction is initiated. For example, it may be divided into a 5×5 pattern of areas or a 7×5 pattern of areas in consideration of the shape and size of the display unit 110, and such ratio of area division may be saved in default or embodied so as to be selectable by the user.

In some exemplary embodiments, a calibration mode may be entered through a user command or predetermined event, such as, for example, a prescribed menu or a particular button. The calibration mode may be a mode for correcting a non-uniformity phenomenon where a color information moves or brightness changes even when the same color must be expressed due to color characteristics, electrical characteristics or optical characteristics as described above.

An image generating unit 120 may generate a guide image for displaying an arrangement position of the calibrator. In some exemplary embodiments, the image generating unit 120 may generate the guide image in graphical user interface (GUI) forms displayed on the calibration screen.

The image generating unit 120 may generate a guide image for guiding the arrangement position of the calibrator by using an actual image stored in a storage unit 140.

Accordingly, in exemplary embodiments according to the present inventive concept, a user of the display apparatus 100 is able to perform an exact calibration operation because a guide image for guiding an arrangement position of the calibrator is displayed in consideration of an apparatus characteristics and size of the calibrator and display apparatus so that the calibrator can measure exact positions of each area on the display screen.

Figure 3A:
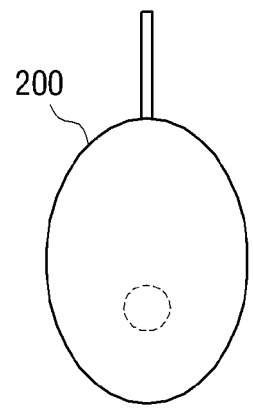
FIGS. 3A and 3B are views which illustrate the structures of a front side and a back side of a display calibrator according to an exemplary embodiment of the present inventive concept.
Figure 3B:
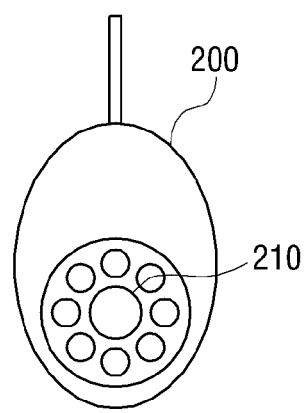

FIGS. 3A and 3B are views which illustrate a structure of a front side and back side of the display calibrator according to an exemplary embodiment of the present inventive concept.

As shown in FIGS. 3A and 3B, there is a certain distance between the outer perimeter of the calibrator and the position of a sensor within the calibrator. In general, the size of the sensor is relatively small, whereas the size of the calibrator which covers the sensor is relatively large. Accordingly, there is a need to display a guide image to guide an arrangement position of the calibrator for an exact calibration operation.

Meanwhile, a spectrophotometer or a chromameter may be used as a calibrator. Importantly, a spectrophotometer can directly be used in a color mixing process because the spectrophotometer can obtain a color arrangement value automatically. Further, because the spectrophotometer uses a spectral strength distribution to calculate a color value, color values may be obtained under various light source conditions. The configuration of a chromameter is relatively simple and consists of inexpensive equipments such as a light source specimen rock and a photodetector. Detailed explanation of the above shall be omitted.

Figure 4:
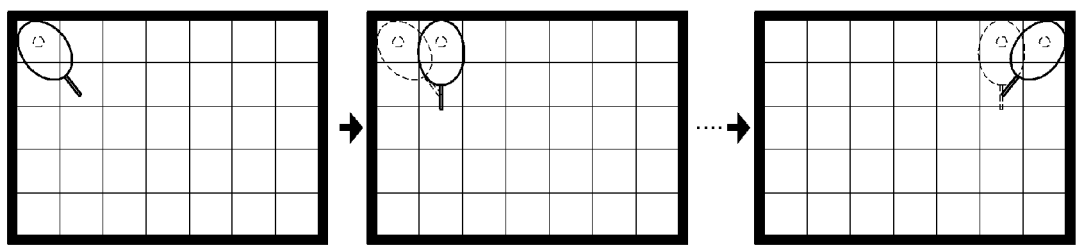
FIG. 4 is a view which illustrates a guide image displaying method according to an exemplary embodiment of the present inventive concept.

FIG. 4 is a view which illustrates a guide image displaying method according to an exemplary embodiment of the present inventive concept.

FIG. 4 illustrates a case where calibration is performed in a left-to-right direction starting from a top left corner area in consecutive order.

As illustrated, firstly it can be seen that a guide image corresponding to the top left corner area is displayed, and when calibration of the respective area is performed, the guide image displayed on the respective area disappears and a guide image corresponding to a next area is displayed. In some cases, it may be possible to embody the guide images to be displayed and then to disappear in predetermined units.

However, the exemplary embodiment illustrated in FIG. 4 is a mere example, and thus according to other exemplary embodiments, it may be possible to embody the guide images of the areas where calibration has been completed to disappear in consecutive order.

According to another exemplary embodiment, it is possible to embody a plurality of guide images corresponding to all areas where calibration is to be performed to be displayed, and then to cause the plurality of guide images which are displayed after the calibration of all areas has been completed to disappear.

Figure 5A:
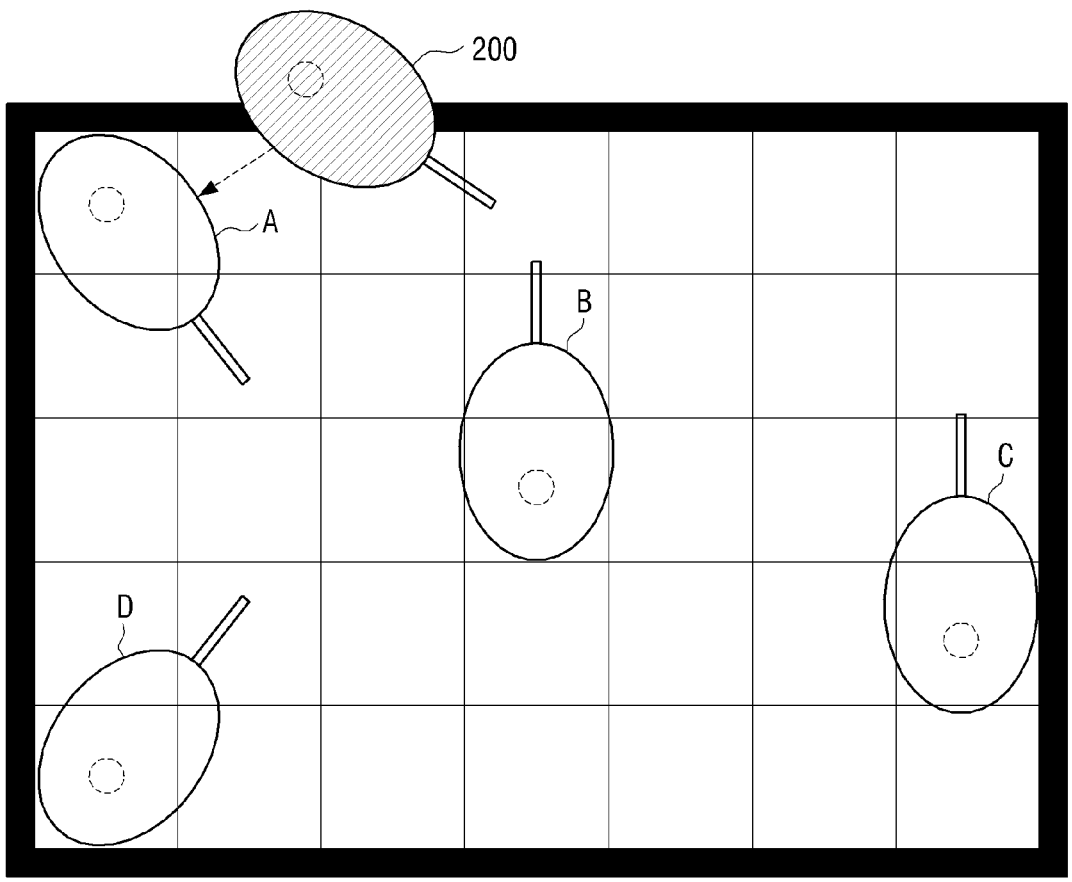
FIGS. 5A, 5B, and 5C are views which illustrate a guide image shape according to various exemplary embodiments of the present inventive concept.

Referring to FIG. 5A, a guide image of a calibrator may be of a same shape and size as the calibrator which is actually used.

In addition, as illustrated, the guide images which are displayed on corner areas or edge areas of a plurality of areas divided for a calibration operation may be rotated so that calibration is performed in the center of the respective area.

Figure 5B:
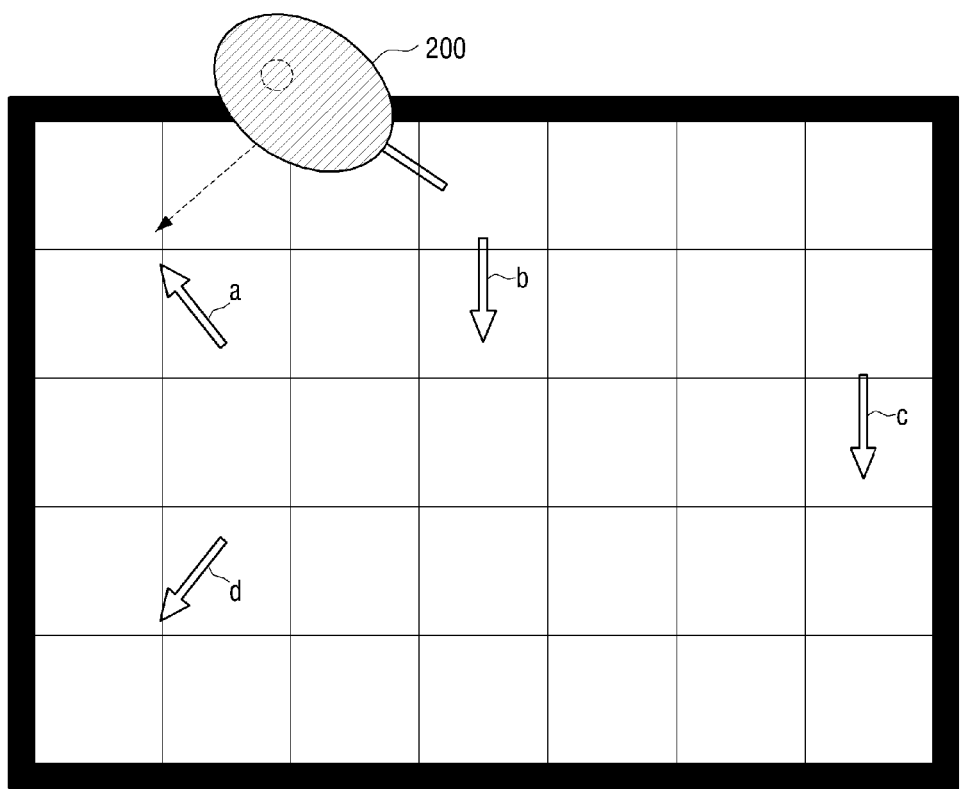

Referring to FIG. 5B, the guide image of a calibrator may be one of guide images a, b, c, d, each of which displays the directivity and a portion of the calibrator.

In addition, as illustrated, the guide images a, b, c, d may be guide images which display the directivity so as to induce rotation of the calibrator in the corner areas or the edges area of the plurality of areas divided for calibration operation.

Figure 5C:
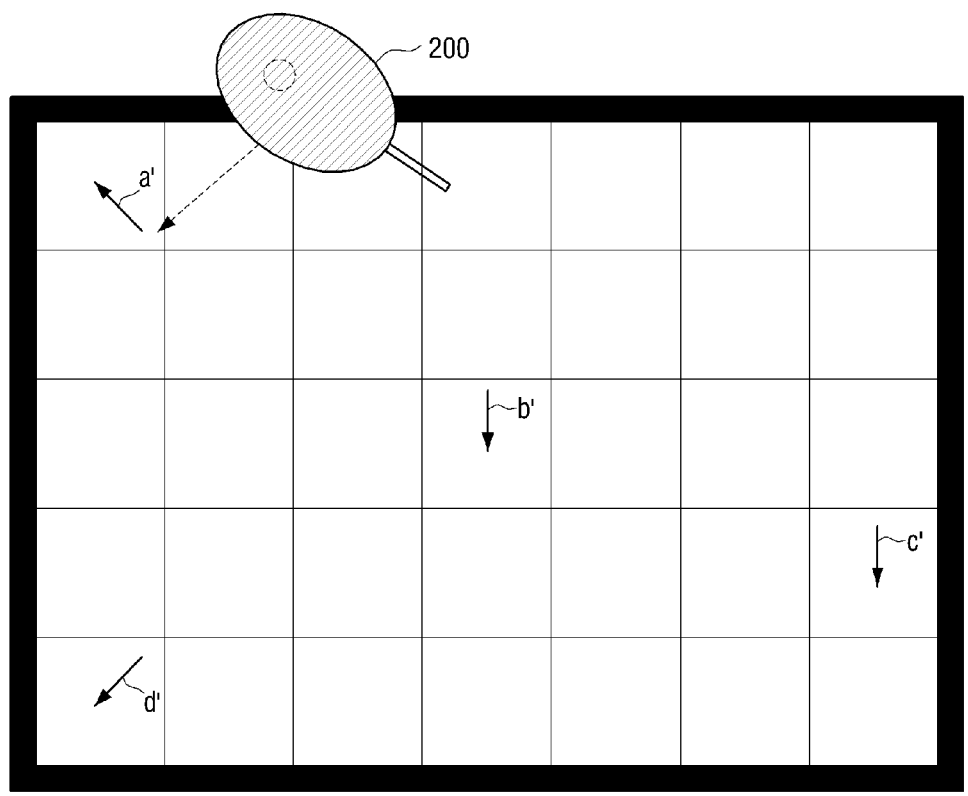

Referring to FIG. 5C, the guide images of the calibrator may merely be guide images a', b', c', d' which display the directivity in each respective area.

In addition, as illustrated, the guide images a', b', c', d' may be guide images which display the directivity so as to induce rotation of the calibrator in the edge areas or the corner areas of the plurality of areas divided for calibration operation.

Meanwhile, the exemplary embodiments illustrated in FIGS. 5A and 5B show the shapes of the guide images in each area, and it should be apparent to those of ordinary skill in the art that these drawing figures represent a state where the guide image is displayed at several points.

Figure 6:
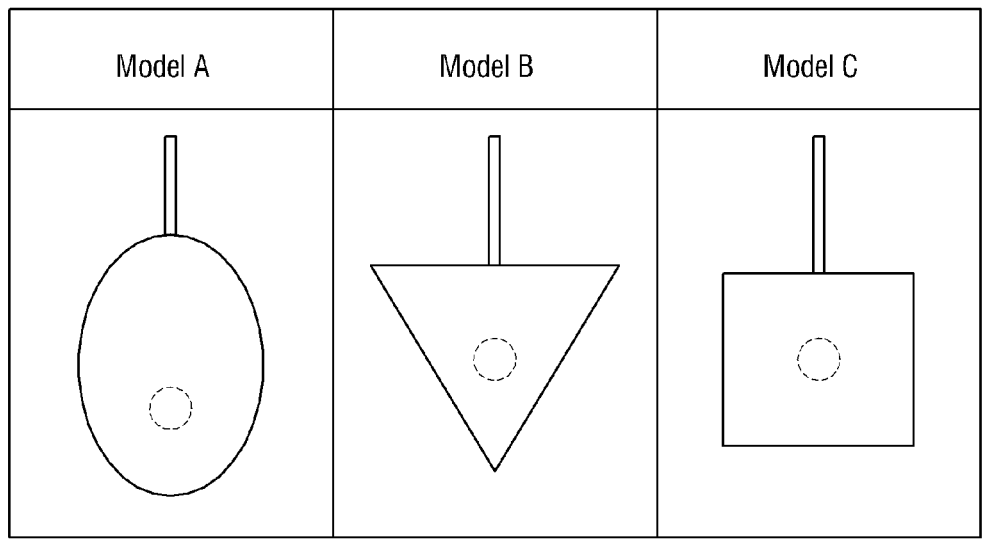
FIG. 6 is a view which illustrates a shape of a calibrator information according to an exemplary embodiment of the present inventive concept.

FIG. 6 is a view which illustrates a state of calibrator information according to an exemplary embodiment of the present inventive concept.

As illustrated in FIG. 6, the display apparatus 100 may be storing a calibrator image corresponding to each model type, and if a predetermined calibrator model is selected according to predetermined event or a user command, it becomes possible to generate a guide image by using a stored image.

Figure 7:
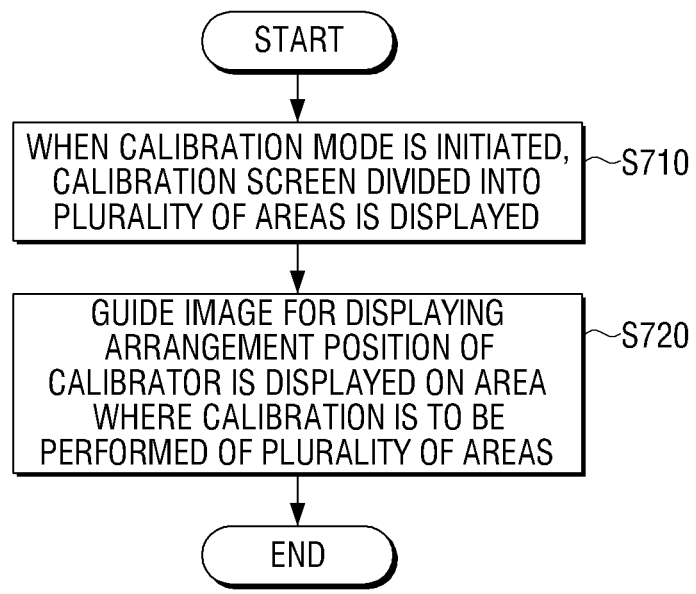
FIG. 7 is a flow chart which illustrates a calibration method of a display apparatus according to an exemplary embodiment of the present inventive concept.

FIG. 7 is a flow chart to illustrate a calibration method of a display apparatus according to an exemplary embodiment of the present inventive concept.

According to the calibration method of the display apparatus illustrated in FIG. 7, firstly, when a calibration mode is initiated, a calibration screen divided into a plurality of areas is displayed at step S710.

Thereafter, a guide image for displaying an arrangement position of the calibrator is displayed on an area of the plurality of areas where calibration is to be performed, at step S720.

In this case, S720 may include displaying the guide image on one area of the areas where calibration is to be performed, deleting the guide image which was displayed when calibration has been completed in the area where the guide image is displayed, and displaying a guide image on a next area of the areas where calibration is to be performed.

In addition, S720 may include displaying a plurality of guide images on all areas where calibration is to be performed.

Furthermore, the guide image of the plurality of guide images on the area where calibration has been completed may be deleted.

In some exemplary embodiments, the guide image may be of a same shape and size as the calibrator.

In addition, the guide image which is displayed on corner areas or edge areas of the plurality of areas where calibration is to be performed may be rotated so that the calibration is performed in the center of the respective area.

In addition, the guide image may be a guide image which displays directivity of the calibrator.

The guide image may also be a guide image which displays directivity so as to induce rotation of the calibrator in corner areas or edge areas of the plurality of areas where calibration is to be performed.

Further, an exemplary embodiment according to the present inventive concept provides a storage medium which includes a program for performing a calibration method of a display apparatus as described above, that is, a computer readable recording medium. A computer readable recording medium may include any types of recording apparatuses where data readable by a computer system are capable of being stored. Examples of a computer readable recording medium include ROM, RAM, CD-ROM, magnetic tape, floppy disk, and photo-data storage apparatus. In addition, a computer readable recording medium may be dispersed in a computer system connected by network, and codes that can be read by the computer may be stored and executed.

Accordingly, the exemplary embodiments described above provide a capability to improve user convenience and exactness of calibration.

While exemplary embodiments of the present inventive concept have been shown and described, it will be appreciated by those of ordinary skill in the art that various changes in form and details may be made in these embodiments without departing from the principles and spirit of the inventive concept, the scope of which is defined in the claims and their equivalents. The exemplary embodiments should be considered in a descriptive sense only and not for purposes of limitation. Therefore, the scope of the present inventive concept is defined not by the detailed description but by the appended claims, and all differences within the scope will be construed as being included in the present disclosure.

What is claimed is:

1. A display apparatus comprising:
    a display unit which displays a calibration screen which is divided into a plurality of areas, when a calibration mode is initiated;
    an image generating unit which generates a guide image for displaying an arrangement position of a calibrator on the calibration screen; and
    a controlling unit which controls the display unit to display the guide image on an area of the plurality of areas where a calibration is to be performed, wherein the controlling unit controls the display unit to display the guide image on at least one area of the plurality of areas where the calibration is to be performed, to delete the displayed guide image when the calibration has been performed on the at least one area, and to display the guide image on a next area.

2. The display apparatus as claimed in claim 1, wherein the controlling unit controls the display unit to display a plurality of guide images on all areas where the calibration is to be performed.

3. The display apparatus as claimed in claim 2, wherein the controlling unit controls the display unit to delete the display of guide images from areas where calibration has been performed.

4. The display apparatus as claimed in claim 1, wherein the guide image is an image of a same shape and size as the calibrator relative to the calibration screen, and the guide image which is displayed on an edge area or a corner area of the plurality of areas is rotated so that the corresponding calibration is performed in a center of the respective area.

5. The display apparatus as claimed in claim 1, wherein the guide image displays directivity so as to induce rotation of the calibrator in edge areas or corner areas of the plurality of areas.

6. The display apparatus as claimed in claim 1, wherein the controlling unit performs a non-uniformity correction with respect to at least one from among a color information and a brightness of an area where a calibration is to be performed.

7. The display apparatus as claimed in claim 6, wherein the controlling unit modifies the calibration screen in response to the performed non-uniformity correction.

8. A method for performing a calibration using a display apparatus, the method comprising:
    displaying a calibration screen which is divided into a plurality of areas when a calibration mode is initiated; and
    displaying a guide image for indicating an arrangement position of a calibrator on an area of the plurality of areas where the calibration is to be performed, wherein the displaying a guide image comprises:
    displaying the guide image on at least one area where the calibration is to be performed; and
    when the calibration is completed in the at least one area where the guide image is displayed, deleting the guide image from the at least one area; and
    displaying a guide image on a next area of the plurality of areas where the calibration is to be performed.

9. The method as claimed in claim 8, wherein the displaying a guide image includes displaying a plurality of guide images on all areas where the calibration is to be performed.

10. The method as claimed in claim 9, further comprising deleting guide images on areas where calibration has been performed.

11. The method as claimed in claim 8, wherein the guide image is an image of a same shape and size as the calibrator relative to the calibration screen, and the guide image displayed on an edge area or a corner area of the plurality of areas is rotated so that the calibration is performed in a center of the respective area.

12. The method as claimed in claim 8, wherein the guide image displays directivity so as to induce rotation of the calibrator in edge areas or corner areas of the plurality of areas.

13. A non-transitory computer readable recording medium having recorded thereon a program executable by a computer for performing a method for performing a calibration by using a display apparatus, the method comprising:
    displaying a calibration screen divided into a plurality of areas when a calibration mode is initiated; and
    displaying a guide image for indicating an arrangement position of a calibrator on an area of the plurality of areas where the calibration is to be performed, wherein the displaying a guide image comprises:
    displaying the guide image on at least one area where the calibration is to be performed; and
    when the calibration is completed in the at least one area where the guide image is displayed, deleting the guide image from the at least one area; and
    displaying a guide image on a next area of the plurality of areas where the calibration is to be performed.

14. A computer readable recording medium as claimed in claim 13, wherein the guide image is an image of a same shape and size as the calibrator relative to the calibration screen, and the guide image displayed on an edge area or a corner area of the plurality of areas is rotated so that the calibration is performed in a center of the respective area.

15. A computer readable recording medium as claimed in claim 13, wherein the guide image displays directivity so as to induce rotation of the calibrator in edge areas or corner areas of the plurality of areas.

16. A display apparatus, comprising:
    a calibration screen which is divided into a plurality of areas;

an image generating unit which generates a guide image for indicating an arrangement position of a calibrator; and a controlling unit which controls a positioning of the guide image within the calibration screen, wherein the controlling unit is configured to cause the guide image to be displayed in a first area prior to a calibration in the first area and, when the calibration in the first area has been completed, to delete the display of the guide image in the first area and to cause the guide image to be displayed in a next area to be calibrated.

17. The display apparatus of claim 16, wherein the guide image is of a same shape and size as the calibrator relative to each of the areas to be calibrated.

18. The display apparatus of claim 16, wherein the guide image is rotatable such that a directivity of the calibrator is indicated.

19. The display apparatus of claim 16, wherein the guide image is rotatable such that a directivity of a calibrator is indicated.

20. A method for performing a calibration, comprising:
displaying a calibration screen which is divided into a plurality of areas; and
displaying a guide image on at least one area of the calibration screen in which the calibration is to be performed, wherein the displaying a guide image includes displaying the guide image in a first area prior to the performance of the calibration, and, when the calibration of the first area has been completed, deleting the guide image in the first area and displaying the guide image in a next area to be calibrated.

21. The method of claim 20, wherein the guide image is of a same shape and size as a calibrator relative to each of the areas to be calibrated.

* * * * *